(12) United States Patent
Manion et al.

(10) Patent No.: US 10,825,062 B1
(45) Date of Patent: Nov. 3, 2020

(54) METHODS AND SYSTEMS FOR IMPLEMENTING AUTOMATED BIDDING MODELS

(71) Applicant: Capital One Services, LLC, McLean, VA (US)

(72) Inventors: Patrick Manion, Frisco, TX (US); Edmond Truong, Sugar Land, TX (US); Meng Sun, Plano, TX (US); Jie Shen, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/560,421

(22) Filed: Sep. 4, 2019

(51) Int. Cl.
| | |
|---|---|
| *H04L 5/00* | (2006.01) |
| *G06Q 30/02* | (2012.01) |
| *G06Q 10/06* | (2012.01) |

(52) U.S. Cl.
CPC ....... *G06Q 30/0275* (2013.01); *G06Q 10/067* (2013.01); *G06Q 30/0256* (2013.01)

(58) Field of Classification Search
None
See application file for complete search history.

(56) References Cited

U.S. PATENT DOCUMENTS

| | | | |
|---|---|---|---|
| 2006/0136325 A1 | 6/2006 | Barry et al. | |
| 2011/0077989 A1* | 3/2011 | Akred | G06Q 10/06 705/7.38 |
| 2011/0106642 A1* | 5/2011 | Hassan | G06Q 30/02 705/26.3 |
| 2012/0290386 A1* | 11/2012 | Skinner | G06Q 30/02 705/14.46 |
| 2013/0138507 A1* | 5/2013 | Kumar | G06Q 30/0251 705/14.54 |
| 2015/0066661 A1 | 3/2015 | Bhattacharjee | |
| 2015/0095142 A1 | 4/2015 | Nguyen et al. | |
| 2016/0104207 A1 | 4/2016 | Zhao et al. | |
| 2018/0096397 A1 | 4/2018 | Goeldi et al. | |
| 2018/0240136 A1 | 8/2018 | Khabazian | |

FOREIGN PATENT DOCUMENTS

WO    WO 2015/051025    4/2015

* cited by examiner

*Primary Examiner* — Thomas L Mansfield
(74) *Attorney, Agent, or Firm* — Bookoff McAndrews, PLLC

(57) ABSTRACT

A system may include an aggregate model comprising a plurality of modules, a monitoring dashboard in communication with the aggregate model, and a search-marketing campaign manager in communication with the aggregate model, the monitoring dashboard, and a search engine entity. Additionally, the system may include a bidding interface in communication with the aggregate model and a search engine entity and/or a monitoring dashboard configured to generate model adjustment data. The search-marketing campaign manager may be configured to determine trend data, measured marketing indicators, or both, from one or more of marketing data or historical data.

20 Claims, 4 Drawing Sheets

METHODS AND SYSTEMS FOR IMPLEMENTING AUTOMATED BIDDING MODELS

TECHNICAL FIELD

Various embodiments of the present disclosure relate generally to systems and methods for implementing automated bidding models. More specifically, embodiments of the present disclosure relate to methods and systems for determining a bid value related to target keywords.

BACKGROUND

Marketing practices may involve attracting one or more internet users to a particular website with the objective to promote, advertise, offer, and/or sell products, engage with prospective customers, and/or conduct other business activities, such as, for example, market research. Because a large number of internet users rely on searching technologies or search engines to navigate the internet and find information, marketers may conduct search-marketing campaigns. Search-marketing may involve the auctioning of keywords by a search engine to improve visibility of an entity or an entity's website (e.g., landing page) during searches of auctioned words. An entity, in implementing a search-marketing campaign, may bid to increase the visibility of one or more webpages and/or web sites. The bids received from a plurality of entities may be ranked based on, among other factors, a bid value of the submitted bids of the entities, the quality of the entities' websites, and/or the relevance of the entities' websites to the searched keywords.

Currently available metrics and analytics of search-marketing campaigns may operate on fixed, long-term time scales which may not allow for fine-tuning of the campaigns or analysis of whether bids on target keywords create customer engagement in near real time. Further, many metrics are only available from the search engines or other stakeholders with vested interests in keeping bidding prices high. The lack of availability of these metrics and analytical tools creates inefficiencies in the bidding process and other aspects of search-marketing campaigns.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining a bid value based on an aggregate model. Each of the examples disclosed herein may include one or more of the features described in connection with any of the other disclosed examples.

In one example, a system may include an aggregate model comprising a plurality of modules. Additionally, the system may include a monitoring dashboard in communication with the aggregate model. Further, the system may include determining a search-marketing campaign manager in communication with the aggregate model, the monitoring dashboard, and a search engine entity.

According to another aspect of the disclosure, a system may comprise an aggregate model comprising a plurality of modules. The aggregate model may be in communication with a monitoring dashboard. Additionally, the system may include a bidding interface in communication with the aggregate model and a search engine entity. The bidding interface may be configured to transmit a bid to the search engine entity. Further, the monitoring dashboard may be configured to generate model adjustment data.

According to some exemplary aspects of the present disclosure, a system includes an aggregate model comprising a plurality of modules and a search-marketing campaign manager. In some exemplary aspects of the present disclosure, the search-marketing campaign manager is in communication with a search engine entity the aggregate model, and a bidding interface. Additionally, the bidding interface may be in communication with the aggregate model and may be configured to transmit a bid to the search engine entity. Further, the search-marketing campaign manager may be configured to determine trend data, measured marketing indicators, or both, from one or more of marketing data or historical data.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
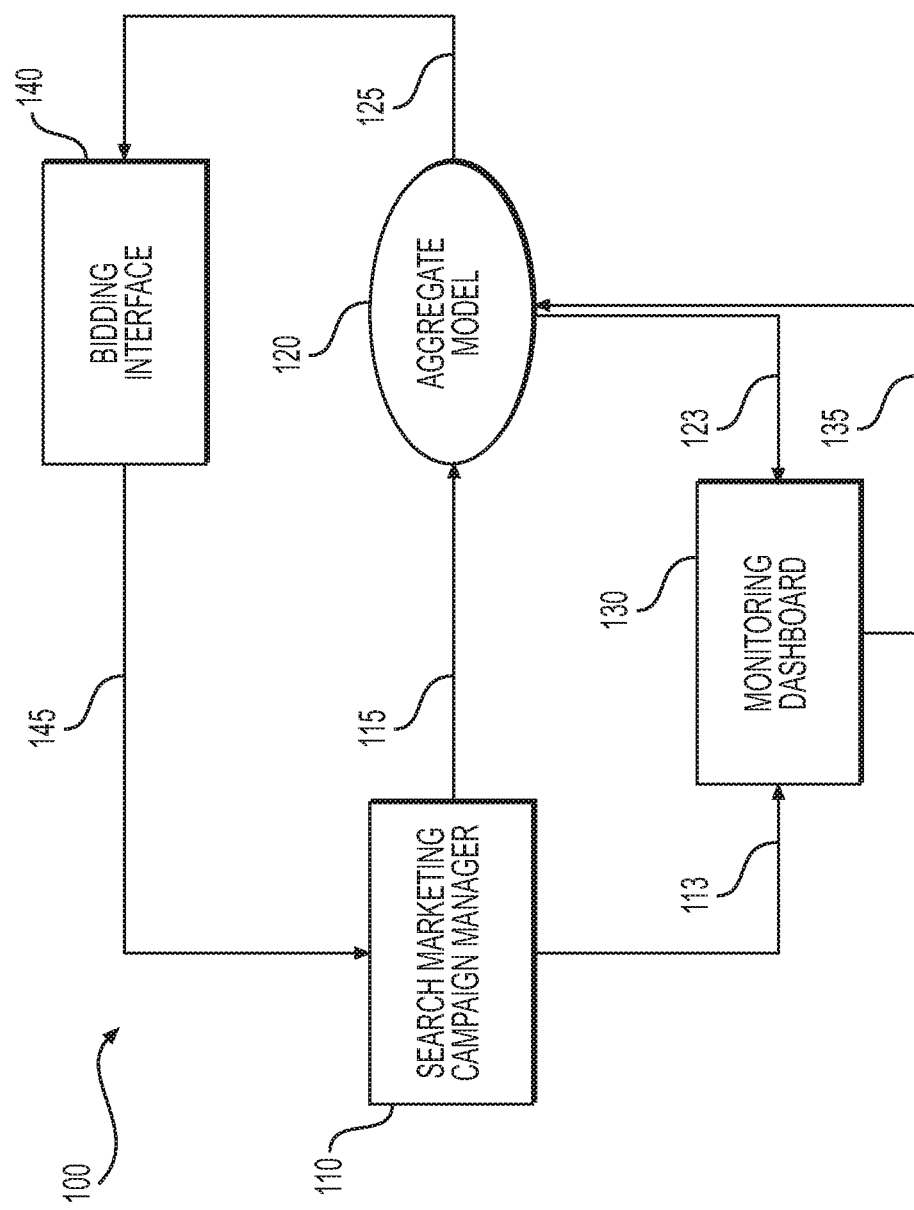
FIG. 1 is a block diagram of an automated bidding system, according to one or more embodiments.

Various embodiments of the present disclosure generally relate to determining a bid value related to a target keyword(s).

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the"

include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value. Additionally, in this disclosure, the term "computer system" generally encompasses any device or combination of devices, each device having at least one processor that executes instructions from a memory medium. Additionally, a computer system may be included as a part of another computer system.

Generally, search-marketing involves multiple entities submitting bids on one or more target keywords (e.g., target keyword phrases) to a search engine, an entity managing the search engine, or other party involved with the management of the search engine (e.g., search engine entity). A bid may be submitted to display a webpage to a user of the search engine in a ranked list provided by the search engine. Any bid placed may correspond to a webpage. In some embodiments, webpages displayed to the user, and corresponding to bids, may be referred to as landing pages (e.g., a webpage where a user may "land" on a website after selecting the webpage from the ranked list, allowing the user to navigate to the rest of the website from the landing page). Each search query entered by a user may include one or more keywords or keyword phrases. In displaying the ranked list, landing pages related to the keywords are ranked and assigned a search engine ranking which may be used to determine which landing pages are displayed in the ranked list of search results and/or an order of which webpages are displayed in the ranked list of search results. For example, a search engine may only display landing pages meeting a threshold search engine ranking. Further, a search engine may display the ranked list of landing pages in descending order based on an associated search engine ranking of the landing pages.

The search engine ranking of each landing page may be determined by a combination of the bid submitted for that landing page and a quality score associated with the landing page (e.g., webpage). The quality score for a particular webpage may be based on the quality of the website hosting the webpage, the relevance of the website to the searched keywords or keyword phrases (e.g., target keywords or target keyword phrases), other data or metrics, or combinations thereof. Each search engine entity that facilitates search engine marketing campaigns may assign a quality score, according to internal, proprietary, or otherwise undisclosed methods/formulae, to each landing page associated with a bid. Further, the search engine rankings may be assigned to landing pages based on various methodologies combining bid prices and quality scores. For example, search engine rankings may be calculated as a product of the quality score and the bid price. The actual cost per click for the bid placer may be based on their bid price, their quality score, their search engine ranking, and the search engine rankings of other entities. For example, a cost per click for a first bid-placing entity may equal a search engine ranking of a second bid-placing entity (e.g., the search engine ranking for the entity ranked immediately below or after the first bid-placing entity) divided by the quality score of the first entity, plus a constant. Table 1, below, shows an example comparison of several entities and their associated bid prices, quality scores, search engine rankings, and cost per click, as determined according to the exemplary methods described above. For example, the cost per click for Entity A at a bid price of $3.00 is equal to the search engine ranking of Entity B divided by the quality score of Entity A, plus a constant $0.01 (16/6+0.01=$2.68).

TABLE 1

Exemplary Search Engine Rankings

|  | Bid Price | Quality Score | Search Engine Ranking | Actual Cost per Click |
| --- | --- | --- | --- | --- |
| Entity A | $3.00 | 6 | 18 | $2.68 |
| Entity B | $4.00 | 4 | 16 | $3.01 |
| Entity C | $6.00 | 2 | 12 | $4.01 |
| Entity D | $8.00 | 1 | 8 | $4.01 |

As can be seen from Table 1, search engine rankings are not determined solely on the basis of quality scores or bids, nor is a bid price the actual cost to an entity. Therefore, in most search marketing campaigns, it may be desirable to configure landing page design and corresponding bid price in such a way to ensure a desired search-engine ranking while minimizing bid price. Due to the attenuated relationship between landing page impressions (e.g., visits) and revenue for the website owner, as well as the propriety nature of search engine rankings, conventional methods have been unable to efficiently determine net present value (NPV) and/or adjust search-marketing campaigns to increase NPV.

In some instances, impressions of, or visits to, a landing page are unrepresentative of the website owner's preferred interaction between a user and the website. For example, the value of a user visit to the landing page may be uncertain, variable, or difficult to ascertain. Further, in such instances, conventional search-marketing metrics such as, for example, cost per click or cost per impression, may be unhelpful in determining the efficiency and/or effectiveness of a search-marketing campaign. Accordingly, in systems and methods of the present disclosure, a plurality of marketing indicators may be measured and/or predicted. Any specific marketing indicators measured or predicted may vary based on the nature of the industry and/or the design of any one specific search-marketing campaign. For example, in some industries, a website owner may be attempting to increase applications for loans through the website. Each of the marketing indicators may focus on a different aspect of engagement between a user and the website. In the loan application example, one or more marketing indicators may include, for example, eligible impressions per search, clicks per eligible impression, loan applications per click, issued loans per application, present value per loan, cost per click, or combinations thereof.

In general, the present disclosure provides automated bidding systems for use in increasing efficiency of search-marketing campaigns and methods for implementing such systems. For example, in one or more embodiments, an automated bidding system may include a search-marketing campaign manager, an aggregate model, a bidding interface, a monitoring dashboard, or combinations thereof. In some embodiments, the aggregate model may include one or more modules, and the modules of the aggregate model may be configured to determine, predict, calculate, and/or estimate one or more marketing indicators for a given target keyword or target keyword phrase. While the disclosure includes descriptions of exemplary methods and systems, it will be understood that the steps of each method and the components of each system may be combined in various combinations or permutations and/or may be mixed and matched. For example, a step from one exemplary method may be used in conjunction with one or more steps of any exemplary method, a component (e.g., subsystem) of a exemplary system may me configured to interface with one or more components of any exemplary system, and any exemplary method may utilize any exemplary system.

FIG. 1 shows an exemplary automated bidding system 100. Automated bidding system 100 may include a search-marketing campaign manager 110, an aggregate model 120, a monitoring dashboard 130, and a bidding interface 140. Although not pictured in FIG. 1, automated bidding system 100 may also include one or more server systems, one or more databases, or combinations thereof. The search-marketing campaign manager 110 may provide trend data 115 and/or historical data to the aggregate model 120, may provide measured marketing indicators 113 to the monitoring dashboard 130, or a combination thereof. In some embodiments, predicted marketing indicators 123 may pass from the aggregate model 120 to monitoring dashboard 130. Monitoring dashboard 130 may compare the measured marketing indicators 113 to the predicted marketing indicators 123 to form model adjustment data 135. In some embodiments, model adjustment data 135 may pass from monitoring dashboard 130 to aggregate model 120. Aggregate model 120 may determine bid data 125 which may be passed to the bidding interface 140. Bidding interface 140 may communicate a bid to the search engine entity, resulting in engagement of a search-marketing campaign. The search engine entity may provide marketing data 145 to search-marketing campaign manager 110. In some embodiments, search-marketing campaign manager 110 may segment, parse, calculate, and/or determine trend data 115, measured marketing indicators 113, or both from marketing data 145.

In some embodiments search-marketing campaign manager 110 is, or includes, an interface with the search engine entity. Search-marketing campaign manager 110 may comprise a system in communication with the search engine entity (e.g., a system in communication with the search engine entity via internet or other network). In some embodiments, search-marketing campaign manager 110 may be an application, subsystem, or program of a system in communication with the search engine entity. For example, search-marketing campaign manager 110 may include one or more processors, one or more databases, one or more applications, one or more user interfaces (e.g., a graphical user interface), application programming interfaces, or combinations thereof. In some embodiments, search-marketing campaign manager 110 may be configured to allow access only from devices and/or users with certain permissions.

Search-marketing campaign manager 110 may have access to or store historical data (e.g., marketing data from previous iterations of one or more search-marketing campaigns). For example, the search-marketing campaign manager 110 may include a database or memory containing historical data or may be in communication with a database or memory containing historical data. The historical data may include details on one or more search-marketing campaigns (e.g., data relating to one or more keywords or keyword phrases). The historical data may include previous auctions, quality scores, bid prices, submitted bids, prime bids, search engine rankings, impressions, clicks, visits, click throughs, applications, loans, loan values, or combinations thereof.

The search-marketing campaign manager 110 may be in communication with the bidding interface 140, the aggregate model 120, the monitoring dashboard 130, or combinations thereof. For example, the search-marketing campaign manager 110 may receive marketing data 145 or other data from bidding interface 140. Marketing data 145 may include, for example, information related to submitted bids, quality scores, ad ranks, one or more marketing indicators, search engine rankings, or similar information related to the bidding, auctioning, webpage content, user activity, or combinations thereof. The search-marketing campaign manager 110 may parse, sort, derive, calculate, determine, or combinations thereof, trend data 115, measured marketing indicators 113, or both from one or more of marketing data 145 and historical data. In some embodiments, search-marketing campaign manager 110 may communicate measured marketing indicators 113 to monitoring dashboard 130. The measured marketing indicators 113 may include one or more measured values relating to marketing indicators, such as, for example, eligible impressions per search, clicks per eligible impression, loan applications per click, issued loans per application, present value per loan, cost per click.

The marketing indicators may be measured over a time period (e.g., one day, three days, five days, one or more weeks, one or more months, a year, etc.). The marketing indicators may be averaged over the time period using one or more statistical means designed to give a representative metric (e.g., an average, a weighted average, or other method). The search-marketing campaign manager 110 may communicate measured marketing indicators 113 to the monitoring dashboard 130 in real-time, near-real time, every bid cycle, daily, or in other regular or irregular intervals.

In some embodiments, search-marketing campaign manager 110 may communicate trend data 115 to aggregate model 120. The aggregate model 120 may include one more modules, such as, for example, a plurality of modules. As described in greater detail below, each module may calculate a different component of the aggregate model. In some embodiments, the calculations and/or determinations of each module may be combined with each other module to determine a bid price, a prime bid price, other information related to bidding and auctioning, or combinations thereof.

The search-marketing campaign manager 110 may be in communication with one or more of aggregate model 120, monitoring dashboard 130, and bidding interface 140 via the internet or other network. In some embodiments, two or more of search-marketing campaign manager 110, aggregate model 120, monitoring dashboard 130, and bidding interface 140 may be subsystems of the same system. One or more systems which may comprise one or more of aggregate model 120, monitoring dashboard 130, and bidding interface 140 may be in communication with each other via the internet or other network. Other suitable networks may include, for example, one or more of a cellular network, a public land mobile network, a local area network, a wide area network, a metropolitan area network, a telephone network, a private network, an ad hoc network, an intranet, a fiber optic based network, a cloud computer network, or combinations and hybrids thereof.

As alluded to previously, aggregate model 120 may, at least partially on the basis of trend data 115, determine, calculate, and/or generate bid data 125. In some embodiments aggregate model 120 may use historical data in its determination, calculation, and/or generation of bid data 125.

Figure 2:
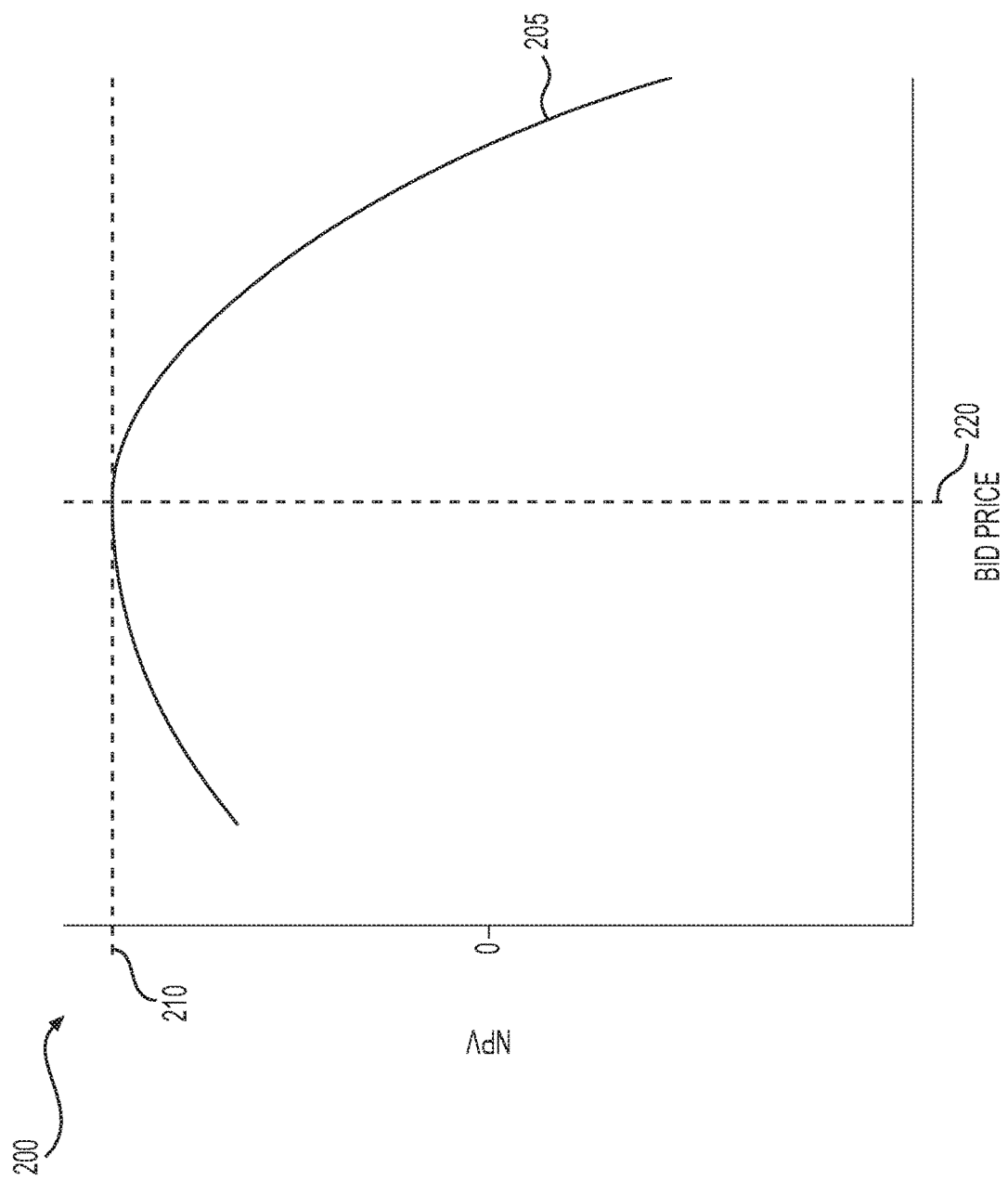
FIG. 2 depicts an example relationship between bid price and net present value (NPV), as determined by an aggregate model, according to one or more embodiments.

Referring to FIG. 2, aggregate model 120 may determine a relationship between bid price and NPV. A correlation curve 205 may describe the relationship between bid price and NPV. A prime bid price 220 may refer to the bid price that corresponds to maximum NPV 210, as described by the correlation curve 205, determined according to aggregate model 120. In some embodiments, as described below, aggregate model 120 may determine correlation curve 205 by iteratively submitting various bid prices and determining the NPV resulting from those bid prices. In some embodiments, a correlation curve 205 is determined for each target keyword or target keyword phrase. In embodiments involving target keywords with a small sample size, aggregate model 120 may incorporate bid prices and resulting NPV from other keywords into the calculation/determination of correlation curve 205. In some embodiments, aggregate model 120 may be used to predict one or more marketing indicators.

As alluded to previously, in some embodiments, there may be an attenuated relationship between bid submitted, and thereby user searches that result in displaying the desired landing page (e.g., impressions), and NPV to the landing page owner. In some embodiments, aggregate model 120 may include one or more modules that are configured to analyze one step in the relationship between bid price and NPV. For example, in some embodiments, a fraction of the impressions are converted into clicks, a fraction of the clicks are converted into loan applications, a fraction of the loan applications may be converted into loans, a fraction of the loans may result in profit, and that profit may be, at least in part, determined based on the cost per click. In such an example, modules of the aggregate model 120 may be configured to determine, predict, calculate, and/or estimate one or more marketing indicators for a given target keyword or target keyword phrase. For example, one or modules may be configured to predict, calculate, estimate and/or determine rate of impressions per user search, rate of clicks per impression, rate of loan applications per click, rate of loans per loan application, present value per loan, cost per click, or combinations thereof.

Each module of aggregate model 120 may base its determinations, calculations, predictions, and/or estimations, on historical data, trend data 115, data received from the search engine entity, other marketing information aggregators, website visitor data, user activities, user information, loan rating, or combinations thereof. Based on this data, each module may utilize regression models (e.g., linear, parabolic, logistic, exponential, and/or trigonometric regression models), point estimators, line-of-business based estimates, weighted averages, or other statistical tools and methods to determine, calculate, predict, or estimate one or more marketing indicators.

In some embodiments, each module of aggregate model 120 is given equal weight in the determination of the prime bid price. In other embodiments, one or more modules may be weighted to be more determinative than other modules in the calculation of prime bid price. The weights of each module may be based on sample size, nature of the marketing indicator being determined, similarity of the data to the target keyword, or combinations thereof.

To better illustrate the methods and systems of the present disclosure, reference will be made to a module that determines, calculates, predicts, and estimates clicks per impressions. It should be understood that this description is not limited to like modules. The methods and systems described herein are applicable to any number of modules relating to any number of marketing indicators. In one or more embodiments, a module may predict the number of clicks generated per impression, based on a target keyword. The module predicts how many users who see the landing page in a list of search results, end up clicking on the landing page. For example, a module may predict that 60% of users whose search query includes the target keyword end up clicking on a link to the landing page for a given bid price. This prediction may be combined with one or more other modules of the aggregate model 120 to determine NPV for a given bid price (as related to the target keyword). For certain target keywords, the number of users who enter search query including the target keyword may be too low to accurately estimate the marketing indicator. In such instances, the module may use data from one or more other keywords and average it with the target keyword data. The average may be weighted based on the similarity of the other keywords to the target keyword.

By way of example and not limitation, in at least one embodiment, aggregate model 120 may include six modules. A first module may determine, calculate, predict, and/or estimate the cost per click associated with a bid price for a target keyword. The first module may include tax rate or other applicable cost modifiers in this determination, calculation, prediction, and or estimation. A second module may determine, calculate, predict, and/or estimate the present value per loan lent for a target keyword. A third module may determine, calculate, predict, and/or estimate a number of loans offered per loan application submitted for a target keyword. A fourth module may determine, calculate, predict, and/or estimate a number of loan applications submitted per landing page click for a target keyword. A fifth module may determine, calculate, predict, and/or estimate the number clicks per eligible impression for a target keyword. A sixth module may determine, calculate, predict, and/or estimate the number of eligible impressions that will be captured in a given population's search engine use for a target keyword. By combining these modules together, for example, as shown in Equation 1, below, net present value (NPV) may be determined, calculated, predicted, and/or estimated for a target keyword. Although not shown in Equation 1, in some embodiments, one or more modules may be weighted in aggregate model 120 based on one or more factors, as discussed below.

$$NPV = \text{Total Search} \times \frac{\text{Eligible Impressions}}{\text{Total Search}} \times \frac{\text{Clicks}}{\text{Eligible Impressions}} \times \left( \frac{\text{Applications}}{\text{Clicks}} \times \frac{\text{Loans}}{\text{Applications}} \times \frac{PV}{\text{Loan}} - \frac{\text{Cost}}{\text{Click}} \right) \quad \text{Eq. (1)}$$

As described below, aggregate model 120 may receive model adjustment data 135 from monitoring dashboard 130. The model adjustment data 135 may include information related to one or more modules of the aggregate model 120. For example, if one or more modules predicts that a given bid price will result in 60% of impressions converting into clicks, but monitoring dashboard 130 determines that this conversion rate is inflated, model adjustment data 135 may be communicated to aggregate model 120 to modify/adjust one or more modules to more accurately predict the rate of impressions being converted into clicks.

Accordingly, aggregate model 120 may also generate predicted marketing indicators 123. The aggregate model 120 may use an actual bid for an actual target keyword (e.g., bid data 125) and, on the basis of trend data 115 and the current iteration of modules of the aggregate model 120, determine one or more predicted marketing indicators 123. The predicted marketing indicators 123 may be communicated to monitoring dashboard 130.

As referred to above, the monitoring dashboard 130 may receive measured marketing indicators 113 from search-marketing campaign manager 110, predicted marketing indicators 123 from aggregate model 120, or a combination thereof. On the basis of one or more of measured marketing indicators 113 and predicted marketing indicators 123, monitoring dashboard 130 may generate model adjustment data 135. For example, in one or more embodiments, monitoring dashboard 130 may compare measured marketing indicators 113 to predicted marketing indicators 123 and generate model adjustment data 135 based on that comparison. The generated model adjustment data 135 may be communicated to aggregate model 120. The model adjustment data 135 may include information on how to adjust one or more modules of the aggregate model 120. The monitoring dashboard 130 may communicate model adjustment data 135 to the aggregate model 120 in real-time, near real-time, every bid cycle, daily, or in other regular or irregular intervals. In some embodiments, the automated bidding system 100 may utilize machine learning to adjust aggregate model 120.

As described previously, aggregate model 120 may determine and/or calculate a prime bid value for one or more target keywords. Bid data 125 may be generated based on the prime bid value. The bid data 125 may be communicated to the bidding interface 140. Based on the bid data 125, bidding interface 140 submits a bid on a target keyword or target keywords. In some embodiments, the bid submitted is the prime bid. In other embodiments, the bid data 125 indicates a bid submission that is +/−10% of the prime bid. For example, one or more modules of aggregate model 120 may include a random number generator (e.g., a weighted random number generator, a pseudorandom number generator, etc.) that generates bid data 125 indicating a bid that is 90% to 110% the value of the prime bid. In one or more embodiments, aggregate model 120 may be configured to generate bid data 125 indicating a bid submission that is +/−10% of the prime bid until a threshold certainty in the calculation of the prime bid value is reached (e.g., a threshold sample size, a threshold variance, or other statistical quantification of certainty). After a threshold certainty is reached, aggregate model 120 may be configured to then communicate bid data 125 to bidding interface 140 that indicates a bid submission of the prime bid.

Bidding interface 140 may include an application, subsystem, and/or program of a system, in communication with the search engine entity. In some embodiments, bidding interface 140 and search-marketing campaign manager 110 are subsystems of, or in communication with, a system in communication with the search engine entity. After bidding interface 140 receives bid data 125, a bid is submitted based on the prime bid value. The bids may enter the market and search engine rankings may be determined on the basis of the bids and quality scores of their associated landing pages. The bids, and search engine rankings, may be updated every second, daily, every week, or other regular or irregular interval of time.

After search engine rankings are assigned, each user search query that includes the target keyword or target keyword phrases may return the landing pages associated with those bids in an order based on the search engine rankings. The order of landing pages in the ranked list may affect the actions of the user and drive a desired interaction between the user and an owner of a landing page listed. As the order of landing pages in the ranked list may direct/affect market traffic, marketing data 145 may be generated. Marketing data 145 may include information relating to submitted bids, quality scores, ad ranks, one or more measured marketing indicators, one or more predicted marketing indicators, eligible impressions per search, clicks per eligible impression, loan applications per click, issued loans per application, present value per loan, cost per click, search engine rankings, or similar information related to the bidding, auctioning, webpage content, user activity, or combinations thereof. As described previously, marketing data 145 may be communicated to search-marketing campaign manager 110 and search-marketing campaign manager 110 may parse, sort, derive, calculate, and/or otherwise determine trend data 115, measured marketing indicators 113, or both from one or more of marketing data 145 and historical data.

Figure 3:
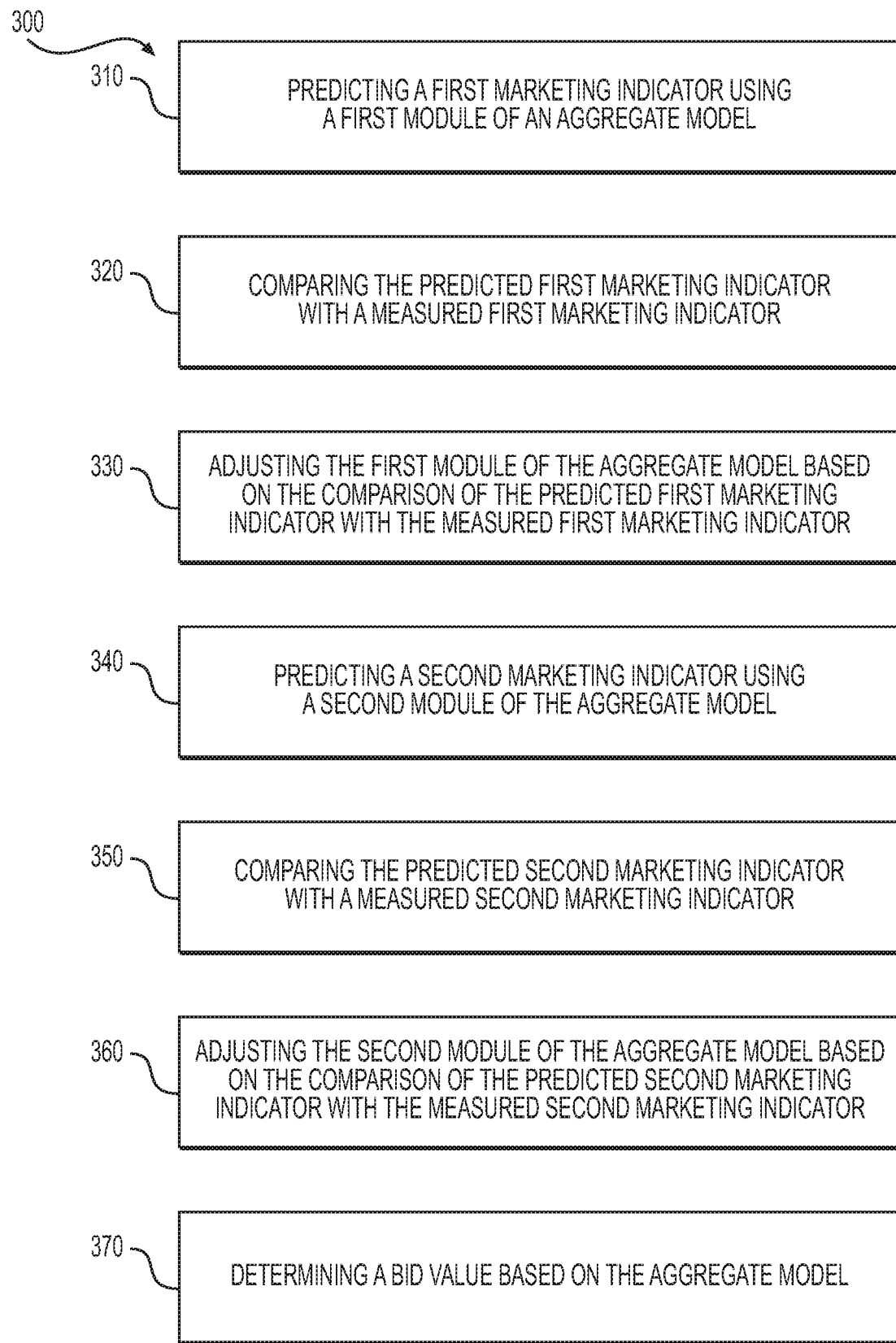
FIG. 3 depicts a flow chart of an example method, according to one or more embodiments.

A method according to the present disclosure is illustrated in flow chart 300 of FIG. 3. The method may include predicting a first marketing indicator using a first module of an aggregate model (Step 310). Next, the method may include comparing the predicted first marketing indicator with a measured first marketing indicator (Step 320). Next, the method may include adjusting the first module of the aggregate model based on the comparison of the predicted first marketing indicator with the measured first marketing indicator (Step 330). Additionally, the method may include predicting a second marketing indicator using a second module of the aggregate model (Step 340) and comparing the predicted second marketing indicator with a measured second marketing indicator (Step 350). Next, the method may include adjusting the second module of the aggregate model based on the comparison of the predicted second marketing indicator with the measured second marketing (Step 360). Additionally, the method may include determining a bid value based on the aggregate model (Step 370). While the method illustrated by flow chart 300 describes the adjusting of a first module and a second module of an aggregate model, the disclosure is not so limited. Rather, in other arrangements, more or fewer modules may be adjusted. For example, in some arrangements, only one module is adjusted, while in other arrangements, three, four, five, or more modules may be adjusted.

According to the present disclosure, one or more aforementioned bidding systems 100 may enable methods which increase the efficiency or effectiveness of search-marketing campaigns. For example, one or more marketing indicators may be predicted by one or more modules of the aggregate model 120. A search-marketing campaign manager 110 may process marketing data 145 to calculate measured marketing indicators 113. The predicted marketing indicators 123 may be compared to the measured marketing indicators 113 (e.g., by a monitoring dashboard 130). Based on the comparison, model adjustment data 135 may be generated (e.g., by a monitoring dashboard 130). Based on the model adjustment data 135, one or more modules of the aggregate model 120 may be adjusted. A bid value may be determined based on the adjusted aggregate model 120.

Figure 4:
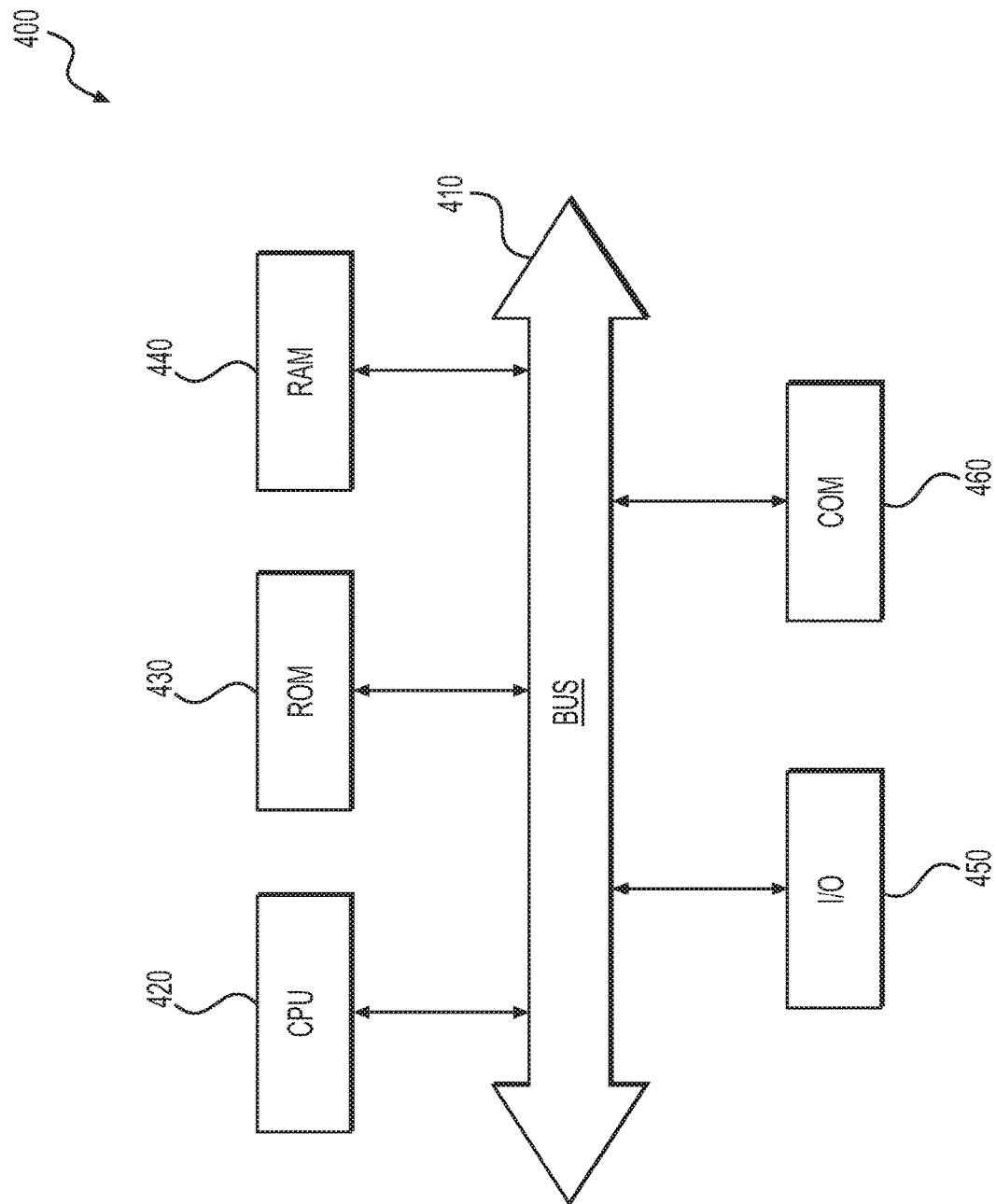
FIG. 4 depicts an exemplary computer device or system, in which embodiments of the present disclosure, or portions thereof, may be implemented.

Various components of bidding systems 100 may include one or more computing devices. As shown in FIG. 4, such devices 400 may include a central processing unit (CPU) 320. CPU 420 may be any type of processor device including, for example, any type of special purpose or a general-purpose microprocessor device. As will be appreciated by persons skilled in the relevant art, CPU 420 also may be a single processor in a multi-core/multiprocessor system, such system operating alone, or in a cluster of computing devices operating in a cluster or server farm. CPU 420 may be connected to a data communication infrastructure 410, for example, a bus, message queue, network, or multi-core message-passing scheme.

Device 400 also may include a main memory 440, for example, random access memory (RAM), and also may include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into device 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 400.

Device 400 also may include a communications interface ("COM") 460. Communications interface 460 allows software and data to be transferred between device 400 and external devices. Communications interface 460 may include a modem, a network interface (such as an Ethernet card), a communications port, a PCMCIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of device 400, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A system comprising:
   a processor;
   a communication component operatively connected to the processor, and configured to enable communication between the system and at least a single search engine entity remote from the system; and
   a memory operatively connected to the processor, and storing data and instruction that, when executed by the processor, form:
     an aggregate model that predicts a functional relationship between a bid cost of a bid and a net present value of the bid, the aggregate model including a plurality of modules;
     a monitoring dashboard in communication with the aggregate model, and configured to generate model adjustment data and transmit the model adjustment data to the aggregate model, the model adjustment data including information that causes the aggregate model to adjust one or more of the plurality of modules independently of each other;
     a search-marketing campaign manager in communication with the aggregate model, the monitoring dashboard, and the at least single search engine entity; and
     a bidding interface in communication with the aggregate model and the at least single search engine entity, wherein the bidding interface is configured to transmit a particular bid to the at least single search engine entity using a particular bid cost determined with the aggregate model.

2. The system of claim 1, wherein:
the data stored in the memory includes a database including historical data; and
the search-marketing campaign manager is in communication with the database including historical data.

3. The system of claim 1, wherein the aggregate model is configured to increase net present value of a bid related to a target keyword.

4. The system of claim 3, wherein at least one module of the plurality of modules of the aggregate model is related to a keyword other than the target keyword.

5. The system of claim 1, wherein each module of the plurality of modules of the aggregate model is based on one or more of eligible impressions per search, clicks per eligible impression, applications per click, loans per application, present value per loan, or cost per click.

6. The system of claim 1, wherein the search-marketing campaign manager is configured to transmit first data to the aggregate model, the first data including data indicative of marketing data related to one or more keywords.

7. A system comprising:
a processor;
a communication component operatively connected to the processor, and configured to enable communication between the system and at least a single search engine entity remote from the system; and
a memory operatively connected to the processor, and storing data and instruction that, when executed by the processor, form:
an aggregate model that predicts a functional relationship between a bid cost of a bid and a net present value of the bid, the aggregate model including a plurality of modules, the aggregate model being in communication with a monitoring dashboard; and
a bidding interface, in communication with the aggregate model and the at least single search engine entity, configured to transmit a particular bid to the at least single search engine entity having a particular bid cost based on the aggregate model;
wherein the monitoring dashboard is configured to generate model adjustment data and transmit the model adjustment data to the aggregate model, the model adjustment data including information that causes the aggregate model to adjust one or more of the plurality of modules independently of each other.

8. The system of claim 7, further comprising a search-marketing campaign manager in communication with the at least single search engine entity, the aggregate model, and the monitoring dashboard.

9. The system of claim 8, wherein the search-marketing campaign manager is configured to determine trend data, measured marketing indicators, or both, from one or more of marketing data or historical data.

10. The system of claim 8, wherein the search-marketing campaign manager is configured to transmit trend data to the aggregate model, transmit measured marketing indicators to the monitoring dashboard, or both.

11. The system of claim 8, wherein the search-marketing campaign manager is configured to:
determine trend data, measured marketing indicators, or both, from one or more of marketing data or historical data; and
transmit trend data to the aggregate model, transmit measured marketing indicators to the monitoring dashboard, or both.

12. The system of claim 7, wherein the aggregate model is configured to transmit the bid data to the bidding interface, transmit predicted marketing indicators to the monitoring dashboard, or both.

13. The system of claim 7, wherein the aggregate model is configured to predict the net present value (NPV) as a function of bid cost (Cost) according to:

$$NPV = \text{Total Search} \times \frac{\text{Eligible Impressions}}{\text{Total Search}} \times \frac{\text{Clicks}}{\text{Eligible Impressions}} \times \left(\frac{\text{Applications}}{\text{Clicks}} \times \frac{\text{Loans}}{\text{Applications}} \times \frac{PV}{\text{Loan}} - \frac{\text{Cost}}{\text{Click}}\right).$$

14. The system of claim 7, wherein the model adjustment data includes information that causes the aggregate model to adjust at least two modules of the plurality of modules of the aggregate model independently of each other.

15. A system comprising:
a processor;
a communication component operatively connected to the processor, and configured to enable communication between the system and at least a single search engine entity remote from the system;
a memory operatively connected to the processor, and storing data and instruction that, when executed by the processor, form:
an aggregate model that predicts a functional relationship between a bid cost of a bid and a net present value of the bid, the aggregate model including a plurality of modules;
a monitoring dashboard in communication with the aggregate model, and configured to generate model adjustment data and transmit the model adjustment data to the aggregate model, the model adjustment data including information that causes the aggregate model to adjust one or more of the plurality of modules independently of each other; and
a search-marketing campaign manager in communication with the at least single search engine entity, the aggregate model, and a bidding interface;
wherein the bidding interface is in communication with the aggregate model and is configured to transmit a particular bid to the at least single search engine entity having a particular bid cost based on the aggregate model, and
wherein the search-marketing campaign manager is configured to determine trend data, measured marketing indicators, or both, from one or more of marketing data or historical data.

16. The system of claim 7, wherein the aggregate model is configured to increase net present value of a bid related to a target keyword.

17. The system of claim 16, wherein at least one module of the plurality of modules of the aggregate model is related to a keyword other than the target keyword.

18. The system of claim 7, wherein each module of the plurality of modules of the aggregate model is based on one or more of eligible impressions per search, clicks per eligible impression, applications per click, loans per application, present value per loan, or cost per click.

19. The system of claim 1, wherein the model adjustment data includes information that causes the aggregate model to adjust at least two modules of the plurality of modules of the aggregate model independently of each other.

20. The system of claim 1, wherein the aggregate model is configured to predict the net present value (NPV) as a function of bid cost (Cost) according to:

$$NPV = \text{Total Search} \times \frac{\text{Eligible Impressions}}{\text{Total Search}} \times \frac{\text{Clicks}}{\text{Eligible Impressions}} \times \left( \frac{\text{Applications}}{\text{Clicks}} \times \frac{\text{Loans}}{\text{Applications}} \times \frac{PV}{\text{Loan}} - \frac{\text{Cost}}{\text{Click}} \right).$$

* * * * *